W. F. VEBER.
Cultivator.
No. 31,917. 913,
Patented Apr. 2, 1861.
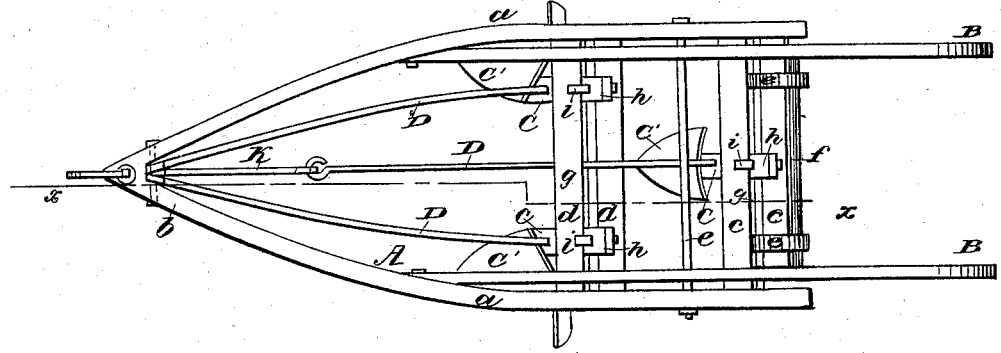
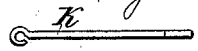
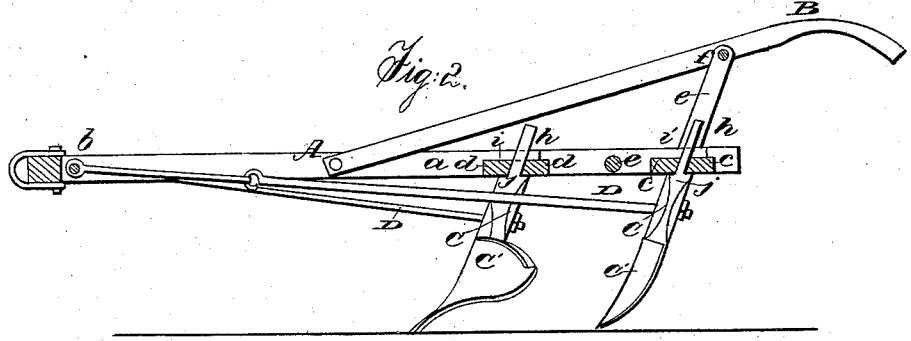
Witnesses:
J. W. Coombs
R. S. Spencer
Inventor:
W. F. Veber
by Munn & Co.
Attys

UNITED STATES PATENT OFFICE.

WM. F. VEBER, OF BOWLING GREEN, OHIO.

IMPROVEMENT IN CULTIVATORS.

Specification forming part of Letters Patent No. 31,917, dated April 2, 1861.

*To all whom it may concern:*

Be it known that I, WILLIAM F. VEBER, of Bowling Green, in the county of Wood and State of Ohio, have invented a new and Improved Cultivator; and I do hereby declare that the following is a full, clear, and exact description of the same, reference being had to the annexed drawings. making a part of this specification, in which—

Figure 1 is a plan or top view of my invention; Fig. 2, a side sectional view of the same, taken in the line $x\ x$, Fig. 1; Fig. 3, a detached view of a link pertaining to the same.

Similar letters of reference indicate corresponding parts in the several figures.

This invention consists in a novel and improved arrangement of a frame, share feet or standards, and brace-rods, as hereinafter fully shown and described, whereby a very stiff and durable cultivator is obtained of light or easy draft, and one that may have its shares readily adjusted, as the nature of the work may require.

To enable those skilled in the art to fully understand and construct my invention, I will proceed to describe it.

A represents the frame of the machine, which is formed of two curved side pieces, $a\ a$, connected together at their front ends by a bolt, $b$, and attached at their back parts to traverse-bars $c\ c\ d\ d$, and a rod, $e$. The side pieces, $a\ a$, when they are attached to the traverse-bars $c\ c\ d\ d$, are parallel with each other; but the front parts of the side pieces are curved gradually from the front traverse-bars, $d\ d$, to their point of connection, as clearly shown in Fig. 1.

B B are handles which are attached to the frame A, one at each side, and supported by uprights $e\ e$ and a horizontal bar, $f$.

The traverse-bars $c\ c\ d\ d$ are placed together in pairs, a narrow space, $g$, being between them to receive the tenons $h$ of feet or standards C, which tenons extend up through the space $g$, and have keys $i$ passing through them, which draw the shoulders $j$ of the feet firmly up against the bottoms of the traverse-bars, as will be fully understood by referring to Fig. 2.

To the lower end of the feet or standards C shares C' are secured.

To each foot or standard C a rod, D, is attached. These rods are all connected to the bolt $b$, as shown clearly in Fig. 1.

When the implement is used as an ordinary cultivator, two feet or standards C are fitted between the front traverse-bars, $d\ d$, and one between the back traverse-bars, $c\ c$, and the front shares are formed with turning mold-boards, which may be adjusted at either side of the frame in order to throw the earth toward or from the plants. The back share is of the ordinary shovel form.

The rods D, it will be seen, transmit the draft-power direct from the clevis to the feet or standards C, and consequently the frame A is not subjected to any appreciable degree of strain, and all racking of the frame is obviated, the implement running smoothly and steadily along.

The implement may be used at any time as a shovel-plow by placing the two front shares side by side, their feet or standards being secured between the back traverse-bars, $c\ c$, the back share being removed. The rods D of the front shares may be lengthened by links $k$ when they are adjusted at the back part of frame A.

The whole device is extremely simple and efficient. The front shares, when the implement is used as a cultivator, may be adjusted nearer together or farther apart, to suit the width of the spaces between the rows.

I do not claim the lateral adjustment of the shares when separately considered; but What I do claim as new, and desire to secure by Letters Patent, is—

The arrangement of frame A, handles B B, slotted standards C, shares C', wedges $i$, rods D D D $k$, and slotted cross-beams $c\ d\ g$, the whole being constructed in the manner and for the purposes herein shown and explained.

WM. F. VEBER.

Witnesses:
NATHAN A. NOBLE,
SILAS R. MUNSELL.